US008023504B2

(12) United States Patent
Shah et al.

(10) Patent No.: US 8,023,504 B2
(45) Date of Patent: Sep. 20, 2011

(54) INTEGRATING SECURITY SERVER POLICIES WITH OPTIMIZED ROUTING CONTROL

(75) Inventors: Pritam Shah, Fremont, CA (US); Kerry E. Lynn, Sudbury, MA (US); Rahul G. Patel, Nashua, NH (US)

(73) Assignee: Cisco Technology, Inc., San Jose, CA (US)

( * ) Notice: Subject to any disclaimer, the term of this patent is extended or adjusted under 35 U.S.C. 154(b) by 352 days.

(21) Appl. No.: 12/199,496

(22) Filed: Aug. 27, 2008

(65) Prior Publication Data

US 2010/0054241 A1    Mar. 4, 2010

(51) Int. Cl.
*H04L 12/28* (2006.01)
*H04L 12/56* (2006.01)
*G06F 15/173* (2006.01)

(52) U.S. Cl. .............. 370/389; 370/395.31; 370/398; 709/244

(58) Field of Classification Search .......... 370/389, 370/395.31, 398; 709/244
See application file for complete search history.

(56) References Cited

U.S. PATENT DOCUMENTS

| | | | |
|---|---|---|---|
| 6,484,261 B1 | 11/2002 | Wiegel | |
| 6,700,891 B1 | 3/2004 | Wong | |
| 6,775,280 B1 | 8/2004 | Ma et al. | |
| 6,816,973 B1 | 11/2004 | Gleichauf et al. | |
| 6,836,462 B1 | 12/2004 | Albert et al. | |
| 6,968,377 B1 | 11/2005 | Gleichauf et al. | |
| 6,988,106 B2 | 1/2006 | Enderwick et al. | |
| 7,082,531 B1 | 7/2006 | Chen et al. | |
| 7,089,211 B1 | 8/2006 | Trostle et al. | |
| 7,093,283 B1 | 8/2006 | Chen et al. | |
| 7,237,267 B2 | 6/2007 | Rayes et al. | |
| 7,249,374 B1 | 7/2007 | Lear et al. | |
| 7,284,068 B1 | 10/2007 | Ramalho | |
| 7,296,155 B1 | 11/2007 | Trostle et al. | |
| 7,346,677 B1 | 3/2008 | Mohaban et al. | |
| 7,366,894 B1 | 4/2008 | Kalimuthu et al. | |
| 7,373,660 B1 | 5/2008 | Guichard et al. | |
| 7,415,023 B2 | 8/2008 | Li et al. | |
| 2003/0125021 A1 * | 7/2003 | Tell et al. ............. | 455/426 |
| 2006/0074899 A1 | 4/2006 | Ederwick et al. | |
| 2006/0253902 A1 | 11/2006 | Rabadan et al. | |
| 2006/0271658 A1 | 11/2006 | Beliles et al. | |
| 2007/0002768 A1 | 1/2007 | Nandy et al. | |
| 2007/0002862 A1 | 1/2007 | Kanekar et al. | |
| 2007/0160015 A1 | 7/2007 | Andriantsiferana | |
| 2007/0165638 A1 | 7/2007 | Hasani et al. | |
| 2007/0195742 A1 | 8/2007 | Erdman et al. | |

* cited by examiner

*Primary Examiner* — Ronald Abelson
(74) *Attorney, Agent, or Firm* — Cesari and McKenna, LLP

(57) ABSTRACT

In one embodiment, a first set of one or more control policies at a control server of a network domain may be transmitted to a routing master controller of the network domain, which uses a second set of one or more traffic policies to determine optimal paths for directing traffic through the domain. The routing master controller may then generate a third set of one or more integrated policies based on the first and second sets of policies, e.g., based on the knowledge and policies of both the control server and the routing master controller.

21 Claims, 10 Drawing Sheets

POLICY TABLE 600

| POLICY CLASSIFICATION 605 | POLICY ACTION 610 |
|---|---|
| "EF" | LOW LOSS |
| VOICE | LOW LATENCY |
| HOST "X" | PRIORITY "I" |
| ⋮ | ⋮ |

ENTRIES 650

FIG. 6

INTEGRATING SECURITY SERVER POLICIES WITH OPTIMIZED ROUTING CONTROL

TECHNICAL FIELD

The present disclosure relates generally to computer networks, and more particularly, to integrating policies of devices in the computer network.

BACKGROUND

A computer network typically comprises one or more nodes interconnected by communication links and segments for transporting data traffic. These nodes, such as personal computers, servers, etc., may interact with one another through one or more intermediate network nodes, such as routers. For interaction between multiple network domains (e.g., autonomous systems or "ASes") one or more edge routers may be employed that allow nodes of different domains to communicate. A particular type of edge router, for example, is an optimized edge router (OER), which may be used to gather network statistics, such as bandwidth, delay, jitter, etc., from communication pathways to help calculate an optimal (e.g., "best") path through which the traffic should travel between the domains (e.g., ASes). In particular, the edge routers may relay the statistics to a routing master controller (RMC) of their respective domain, which may then use those statistics to determine and enforce the optimal path. For example, the optimal path may be determined according to one or more traffic policies, such as based on given traffic types, destination address prefixes, etc. Upon determining the optimal paths, the RMC may notify the edge routers and other routers/devices (of its respective domain) of the optimal paths so those routers/devices may handle traffic in the network accordingly.

Computer networks may also employ distributed security/control services (e.g., with a security/control server and one or more security/control agents) to enforce security/control policies within the network. For example, to ensure secure operation of the network, a particular control policy may involve assigning priorities to different types of traffic, as well as defining actions to be taken in the event of, inter alia, a detected threat, an attack, and/or other actions. Generally, the security/control server may define and distribute the relevant control policies to the one or more agents (e.g., acting on nodes of the network), which are responsible for locally enforcing the specified control policies on the respective nodes (e.g., by taking action, such as marking priorities on traffic, etc.). Notably, the control policies may be further acted upon by routers in the network, such as based on the priorities marked on traffic at the agents, etc.

There may be occasions, however, where a particular network may have both a security/control server and an RMC in operation. Conventionally, there is little or no interaction between the control server and the RMC, and as such, the RMC typically has no knowledge of the control server's traffic policies (and vice versa), that is, without inefficient and cumbersome manual configuration. Accordingly, the RMC would thus be unable to optimize routing paths of the network domain based on those control server traffic policies. Furthermore, without collaboration between the control server and the RMC, conflicts between each of their policies may arise, such as different priority assignments and handling for particular types of traffic, etc.

BRIEF DESCRIPTION OF THE DRAWINGS

The invention may be better understood by referring to the following description in conjunction with the accompanying drawings in which like reference numerals indicate identically or functionally similar elements, of which:

FIG. 6 illustrates an example policy table.

DESCRIPTION OF EXAMPLE EMBODIMENTS

Overview

Figure 1:
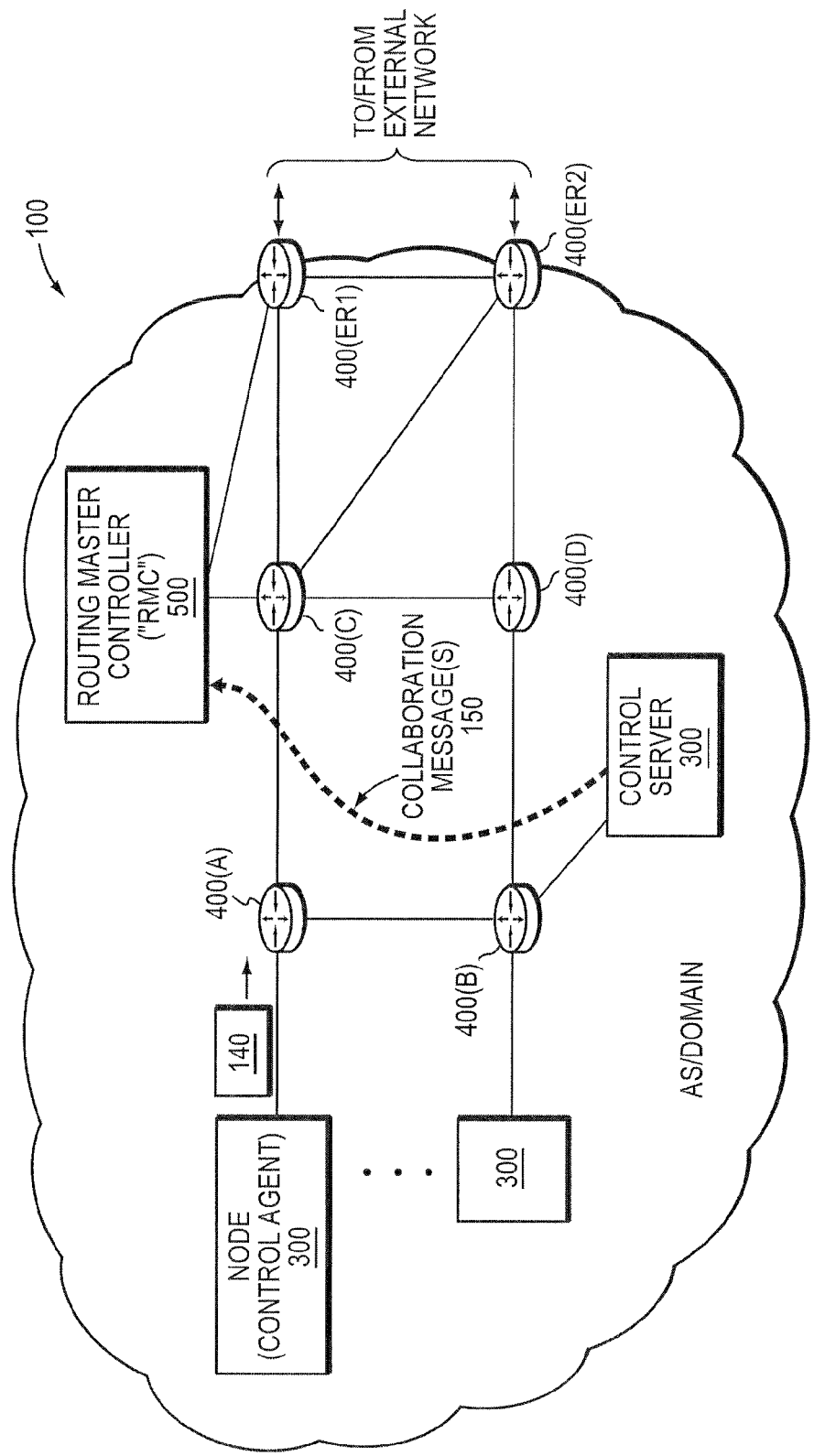
FIG. 1 illustrates an example computer network.

According to embodiments of the disclosure, a first set of one or more control policies at a control server of a network domain may be transmitted to a routing master controller of the network domain, which uses a second set of one or more traffic policies to determine one or more optimal paths for directing traffic through the domain. The routing master controller may then generate a third set of one or more integrated policies based on the first and second sets of policies, e.g., based on the knowledge and policies of both the control server and the routing master controller.

Also, according to embodiments of the disclosure, the routing master controller may classify one or more traffic classes and associate at least one optimal path with each of the one or more traffic classes based on the third set of integrated policies. The routing master controller may notify one or more routers in the network domain of the at least one optimal path for the traffic classes, and the routers may then route traffic based on the traffic class and the associated optimal path (i.e., based on the third set of integrated policies, that is, a combination of both control and traffic policies).

Description

A. Computer Network

A computer network is a geographically distributed collection of nodes interconnected by communication links and segments for transporting data between end nodes, such as personal computers and workstations. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical light paths, synchronous optical networks (SONET), or synchronous digital hierarchy (SDH) links. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Since management of interconnected computer networks can prove burdensome, smaller groups of computer networks may be maintained as routing domains or autonomous systems. The networks within an autonomous system (AS) are typically coupled together by conventional "intradomain" routers configured to execute intradomain routing protocols, and are generally subject to a common authority. To improve routing scalability, a service provider (e.g., an ISP) may divide an AS into multiple "areas" or "levels." It may be desirable, however, to increase the number of nodes capable of exchanging data; in this case, interdomain routers executing interdomain routing protocols are used to interconnect nodes of the various ASes. Moreover, it may be desirable to interconnect various ASes that operate under different administrative domains. As used herein, an AS, area, or level is generally referred to as a "domain" and a node that interconnects different domains together is generally referred to as an "edge node/router" (or "border node/router").

FIG. 1 is a schematic block diagram of an example computer network 100 illustratively comprising end nodes/devices 300 (e.g., personal computers, work stations, etc.) and at least one node/device (e.g., security/control server 200) interconnected by links and network nodes/devices (e.g., routers) 400 within an AS as shown. Illustratively, the nodes 300 may comprise security/control agents in communication with the security/control server 200 as described herein. Client communications, such as data packet traffic, may pass into and out of the AS through one or more interdomain/edge routers 400, e.g., "ER1" and "ER2" as shown. In general, the AS may be an enterprise network, a service provider network, or any other network or subnetwork. Furthermore, the AS may be multi-homed, i.e., comprising a plurality of different peer (neighboring) connections to one or more other routing domains or ASes (e.g., via ER1 and ER2). In addition, routing operations at the edge routers ER1-2 may be managed by a routing master controller (RMC) 500, such as in accordance with optimized edge routing (OER) as described herein (e.g., as an OER "Master node"), which may be connected to the edge routers by, e.g., point-to-point links or a local area network.

Data packets 140 (e.g., traffic) may be exchanged among the nodes/devices of the computer network 100 using predefined network communication protocols such as the TCP/IP, User Datagram Protocol (UDP), Asynchronous Transfer Mode (ATM) protocol, Frame Relay protocol, Internet Packet Exchange (IPX) protocol, etc.

B. Security/Control Server

Figure 2:
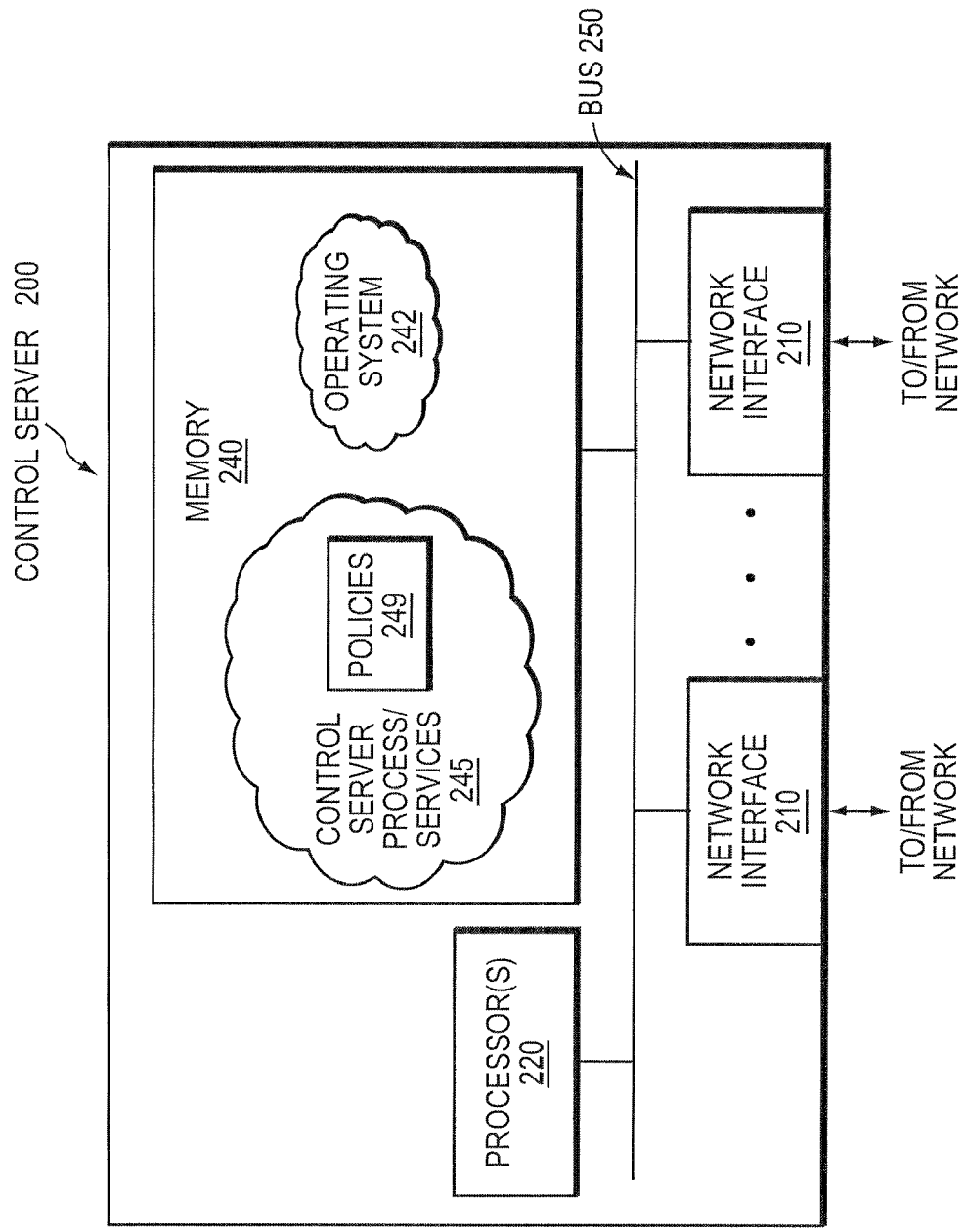
FIG. 2 illustrates an example security/control server.

FIG. 2 is a schematic block diagram of an example node/device that may be advantageously used with one or more embodiments described herein, for instance, as a security/control server 200. The server 200 may comprise a plurality of network interfaces 210, one or more processors 220, and a memory 240 interconnected by a system bus 250. The network interfaces 210 contain the mechanical, electrical, and signaling circuitry for communicating data over physical links coupled to the network 100. The network interfaces may be configured to transmit and/or receive data using a variety of different communication protocols, including, inter alia, TCP/IP, UDP, ATM, synchronous optical networks (SONET), wireless protocols, Frame Relay, Ethernet, Fiber Distributed Data Interface (FDDI), etc.

The memory 240 comprises a plurality of storage locations that are addressable by the processor(s) 220 and the network interfaces 210 for storing software programs and data structures associated with the embodiments described herein. Each processor 220 may comprise necessary elements or logic adapted to execute the software programs and manipulate the data structures, such as security server policies table 249. An operating system 242 (e.g., the Internetworking Operating System, or IOS™, of Cisco Systems, Inc.), portions of which are typically resident in memory 240 and executed by the processor(s), functionally organizes the security/control server by, inter alia, invoking network operations in support of software processes and/or services executing on the device. These software processes and/or services may comprise a security server process 245 in accordance with one or more embodiments described herein. It will be apparent to those skilled in the art that other types of processors and memory, including various computer-readable media, may be used to store and execute program instructions pertaining to the inventive technique described herein. (Notably, an illustrative security/control server that may be configured to operate in accordance with the embodiments described herein is a Cisco Security Agent (CSA) server, available from Cisco Systems, Inc.)

Security/Control server process/services 245 contain computer executable instructions that may be executed by each processor 220 to perform functions directed to defining and managing policies (e.g., security/control policies) in the network 100 for which the server 200 is responsible. In particular, the server process 245 may distinguish/classify traffic based on certain information, such as traffic types and traffic classes to which security policies may be assigned. For example, traffic type information may generally include whether the traffic is voice, data, email, data backup, etc., thus identifying a "type" of traffic, as will be understood by those skilled in the art. In addition, traffic class information may generally include more specific classification, such as particular types of traffic to/from particular sources/destinations, etc., or, even more specifically, to particular application data streams (e.g., a particular stream of data for an application, such as a particular voice call), otherwise often referred to by those skilled in the art as a "flow".

According to embodiments described herein, traffic types/classes may be associated, for instance, with a particular designated marking, such that devices within the network may differentiate packets based on the designated markings. For example, markings are generally used for basic packet identification, as described herein, as well as for other purposes such as for detecting and handling particular packets according to defined policies applied to the associate traffic type/class. For instance, known types of packet markings may include priority values, as well as Differentiated Services Code Point (DSCP) values. Notably, while priority and DSCP fields are mentioned, markings may be based on any field of the packets, such as certain Access Control List (ACL) fields, as will be appreciated by those skilled in the art.

As used herein, a policy (or "treatment") is any defined rule that determines the use of resources within the network. A policy may be based on a user, a device, a subnetwork, a network, or an application. For example, a security/control policy may be defined to grant voice traffic higher priority than data traffic. Also, security/control policies may define a set of hosts as "privileged" hosts, which may have higher priority than other hosts in the network. Another example of security/control policies may involve threat detection to detect, inter alia, various threats, attacks, or other abnormal behavior. Any threats may then be dropped or sent to a quarantine area for further investigation (e.g., firewalls or administrator inspection). Note that the term "security/control policy" is used generally herein to describe policies defined/configured at the security/control server 200, and is not meant to limit the embodiments described herein to security related policies only, such as threat detection, etc. As used herein, therefore, the use of the modifier "security/control" or hereinafter simply "control" implies policies maintained and managed by the security/control server (hereinafter "control server"), as opposed to "traffic policies" maintained and managed by the RMC 500, described below. (For instance, illustrative control policies may be policies for which an execution trigger is an explicit control-plane event, and for which the action(s) does not generally entail the processing of a forwarded data packet.)

Upon defining the control policies, the control server 200 may distribute the policies to one or more "security/control agents" 300 within the network 100, such that the agents may act to enforce the control policies accordingly. Notably, the communication between the control server and agents may be a proprietary protocol or other known communication protocol (e.g., advertisements).

C. Security/Control Agents

Figure 3:
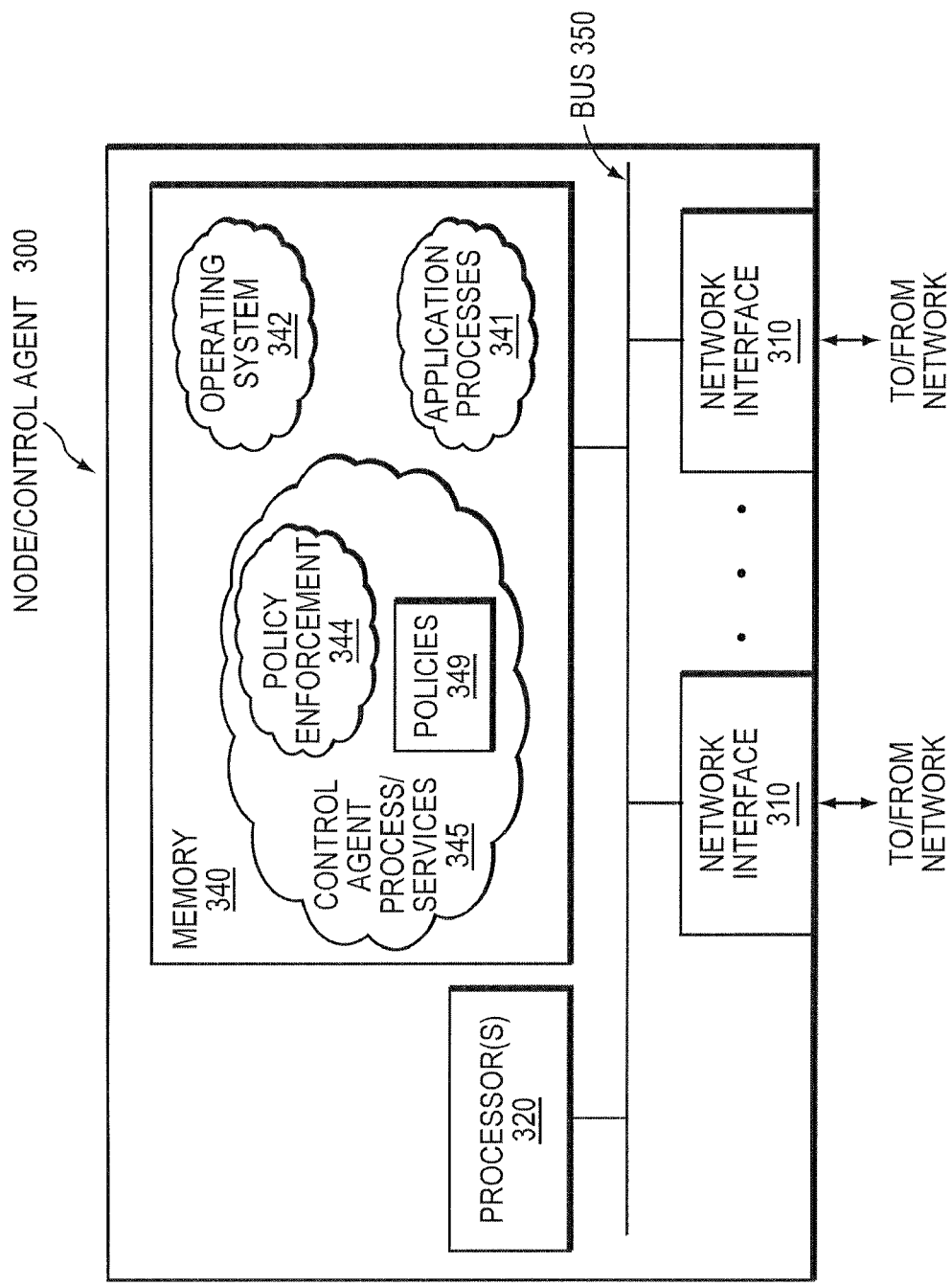
FIG. 3 illustrates an example security/control agent.

FIG. 3 is a schematic block diagram of an example end node/device 300 that may be advantageously used with one or more embodiments described herein, for instance, as a personal computer, workstation, etc. (hereinafter, a "security/control agent" 300, or, simply "control agent" 300). The device (agent 300) may also comprise a plurality of network interfaces 310, one or more processors 320, and a memory 340 interconnected by a system bus 350. The memory 340 comprises a plurality of storage locations that are addressable by the processor(s) 320 and the network interfaces 310 for storing software programs and data structures associated with the embodiments described herein. Each processor 320 may comprise necessary elements or logic adapted to execute the software programs and manipulate the data structures, such as security/control agent policies table 349. An operating system 342 (e.g., the Windows® operating system, available from Microsoft®, Inc. or the Unix® operating system, available from The Open Group®, etc.), portions of which are typically resident in memory 340 and executed by the processor(s), functionally organizes the security agent by, inter alia, invoking operations in support of software processes and/or services executing on the device. These software processes and/or services may comprise one or more application processes 341, security/control agent process/services 345, and policy enforcement process/services 344. It will be apparent to those skilled in the art that other types of processors and memory, including various computer-readable media, may be used to store and execute program instructions pertaining to the inventive technique described herein.

Application processes 341 contain computer executable instructions executed by each processor 320 and operable on the node/device 300 in accordance with one or more applications (e.g., software programs) as will be understood by those skilled in the art. For example, such applications may comprise voice calls, web access, email, word processing, computer games, and/or other applications/programs that may be configured to operate on the node/device 300. Illustratively, applications, as used herein, may be configured to communicate data/traffic over the network 100. Accordingly, a particular application may send a "stream" or "flow" of data over the network, e.g., an "application data stream", such as a particular voice call sending a plurality of data (voice) packets between a particular source (e.g., node 300) and a particular destination (e.g., in a same or different AS of network 100).

Security/control agent process/services 345 contain computer executable instructions executed by each processor 320 to perform functions related to enforcement of control policies in the network. For instance, control agent process/services 345 may receive control policies (and updates) from the control server 200 and thus enforce the policies upon incoming and outgoing traffic to/from the device (agent) 300. In particular, the agent process 345 (acting on nodes 300, e.g., PCs, laptops) may be configured to receive control polices from the control server 200, and to store the policies in a control agent policies table 349. Policies stored in table 349 may then be accessed by the control agent process 345 and applied to incoming/outgoing traffic at the node 300 through policy enforcement process 344.

For example, a control agent 300 may have received from a control server 200 a policy to assign a higher priority (e.g., priority "0") to voice traffic than to data traffic (e.g., priority "1"), such that should there be a contention for resources (e.g., bandwidth), the nodes within the network (e.g., routers 400) may enforce the policies by securing the resources available to send/receive voice traffic before sending/receiving data traffic, as will be appreciated by those skilled in the art. Accordingly, the control agent (process 345) may receive traffic, and based on distinguishing features (such as indicated traffic type, source application, etc.) may determine a policy classification to which the traffic belongs, and may perform the action defined by the policy, e.g., adjusting a priority value of the traffic or, as described herein, inserting a traffic marking (e.g., "EE", "EF", etc.). Alternatively, locally enforced policies may also be defined, such as enforcing various queuing techniques at the node 300 prior to transmitting the traffic in to the network 100 (e.g., voice before data), or blocking traffic received from certain hosts (e.g., malicious traffic), etc. Again, the policies mentioned herein are merely illustrative examples, and are not meant to be limiting to the scope of the embodiments described herein. Once the control agents 300 classify and apply associated policies for outgoing traffic, the traffic may be transmitted into the network 100 toward its destination, e.g., via one or more routers 400.

D. Routers/Edge Routers

Figure 4:
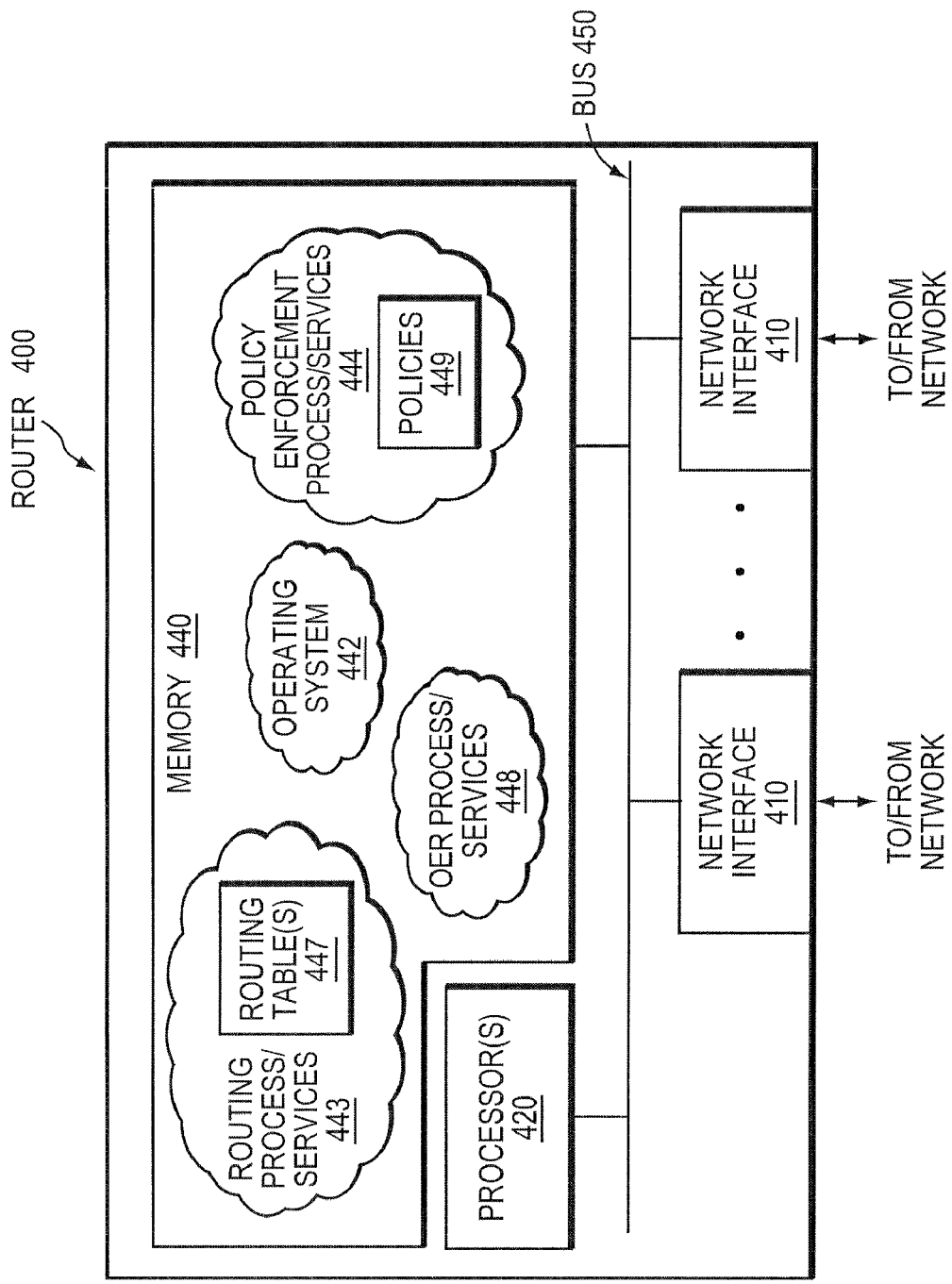
FIG. 4 illustrates an example router.

FIG. 4 is a schematic block diagram of an example node/device 400 that may be advantageously used with one or more embodiments described herein, for instance, as a router and/or an edge router (ER), or generally, "routers". The device (router 400) may comprise a plurality of network interfaces 410, one or more processors 420, and a memory 440 interconnected by a system bus 450. Notably, a physical network interface 410 may also be used to implement one or more virtual network interfaces, such as for Virtual Private Network (VPN) access, known to those skilled in the art. The memory 440 comprises a plurality of storage locations that are addressable by the processor(s) 420 and the network interfaces 410 for storing software programs and data structures associated with the embodiments described herein. Each processor 420 may comprise necessary elements or logic adapted to execute the software programs and manipulate the data structures, such as routing table 447 and policies table 449. An operating system 442 (e.g., IOS™ of Cisco Systems, Inc.), portions of which are typically resident in memory 440 and executed by the processor(s), functionally organizes the router by, inter alia, invoking network operations in support of software processes and/or services executing on the device. These software processes and/or services may comprise routing process/services 443, policy enforcement process/services 444, and (for edge routers) an OER process 448, in accordance with one or more embodiments described herein. It will be apparent to those skilled in the art that other processor and memory means, including various computer-readable media, may be used to store and execute program instructions pertaining to the inventive technique described herein.

Routing process/services 443 contain computer executable instructions executed by each processor 420 to perform functions provided by one or more routing protocols, such as the Interior Gateway Protocol (IGP) (e.g., Open Shortest Path First, "OSPF," and Intermediate-System-to-Intermediate-System, "IS-IS"), the Border Gateway Protocol (BGP), etc., as will be understood by those skilled in the art. These functions may be configured to manage routing/forwarding information databases (e.g., routing table 447) containing, for example, data used to make routing/forwarding decisions. In particular, changes in the network topology may be communicated among routers 400 using routing protocols, such as the conventional OSPF and IS-IS link-state protocols (e.g., to "converge" to an identical view of the network topology).

The routing table 447 is a searchable data structure in which network addresses are mapped to their associated routing information. However, those skilled in the art will understand that the routing table need not be organized as a table, and alternatively may be another type of searchable data structure. Although its routing table may be configured with a predetermined set of routing information, the router also may dynamically acquire ("learn") network routing information as it sends and receives data packets. In addition, the routing table may be populated by various routing protocols (e.g., IGP, BGP, etc.), or other means, such as in accordance with OER as described herein. When a packet is received at the router, the packet's destination address may be used to identify a routing table entry containing routing information associated with the received packet. Among other things, the packet's routing information may indicate the packet's next-hop address. Notably, routing services 443 may also perform functions related to virtual routing protocols, such as maintaining VRF instances (not shown), or tunneling protocols, such as for Multi-Protocol Label Switching, etc., each as will be understood by those skilled in the art.

Policy enforcement process/services 444 contain computer executable instructions that may be executed by each processor 420 to enforce policies, e.g., as stored in a policy table 449. Such policies may include conventional policies known to those skilled in the art for routers 400 of the network 100, such as handling of priority, traffic control (e.g., shaping, dropping, etc.), and other defined polices that may be illustratively received from an administrator or the routing master controller 500 as described herein. For example, policy enforcement process 444 may determine that traffic is designated as having a certain priority, and handling the traffic according to policies in place (in table 449) corresponding to the classified traffic (e.g., queuing higher priority traffic in a high priority queue, etc.). (As an example, while a security agent policy may indicate that a certain host's traffic be granted a particular priority value, the routers of the network act on that priority accordingly.)

Certain routers 400 of the network 100 may be configured to operate in conjunction with optimized edge routing (OER) techniques, e.g., as either optimized edge routers (e.g., ER1 and ER2), or as internal routers (A-D) within the network. Accordingly, such routers may comprise appropriate OER processes/services 448 that contain computer executable instructions that may be executed by each processor 420 to perform functions related to OER. In particular, the OER process 448 executing on the edge routers may monitor of a set of address prefixes (e.g., through passive monitoring and/or active probing) for, inter alia, network statistics corresponding to the monitored prefixes. For example, OER process 448 may monitor delay, round trip time (RTT), data throughput (the amount of data transferred or received), reachability, packet loss, mean opinion score (MOS), bandwidth, utilization, etc., for each of the monitored prefixes.

Notably, while one OER process 448 is illustratively shown in memory 440, it is also possible that the process 448 be distributed in each network interface 410 (not shown). In general, the OER processes may measure any arbitrary traffic metric, including conventional cost-based and distance-based metrics. Further, the OER Process 448 may calculate statistical averages, variances, medians, etc. of a collection of traffic measurements and even send routing updates to other routers 400 of the network 100. These statistics may then be sent to a routing master controller (OER master controller/node) 500 (described below), accordingly. Note also, that the OER process may be in communication with the routing master controller to receive requests to monitor particular prefixes, as well as to receive various other requests/commands, such as policy updates in accordance with the techniques described herein.

E. Routing Master Controller (RMC)

Figure 5:
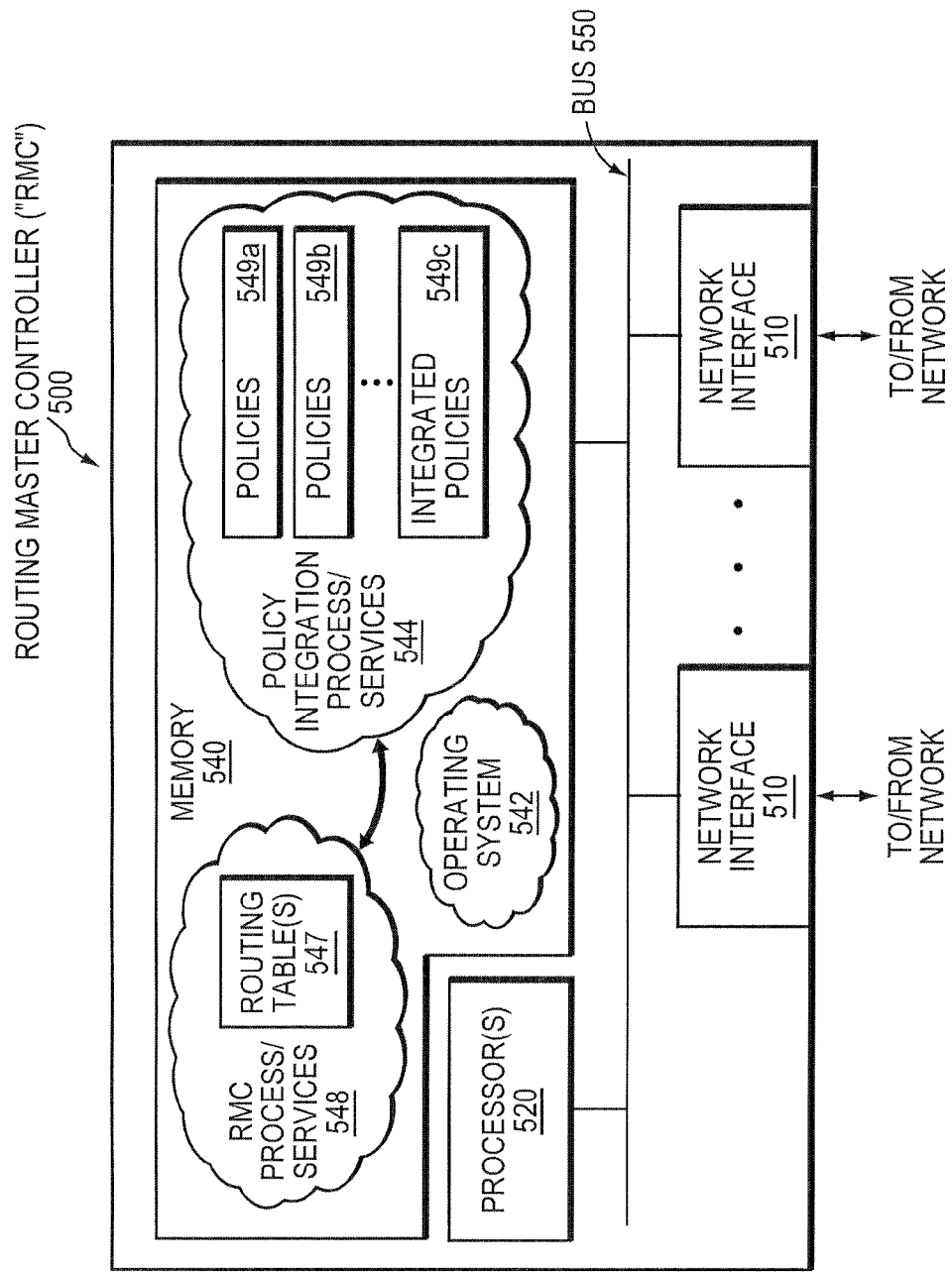
FIG. 5 illustrates an example routing master controller.

FIG. 5 is a schematic block diagram of an example node/device 500 that may be advantageously used with one or more embodiments described herein, for instance, as a routing master controller (or "RMC") 500. The device (RMC 500) may comprise a plurality of network interfaces 510, one or more processors 520, and a memory 540 interconnected by a system bus 550. The memory 540 comprises a plurality of storage locations that are addressable by the processor(s) 520 and the network interfaces 510 for storing software programs and data structures associated with the embodiments described herein. Each processor 520 may comprise necessary elements or logic adapted to execute the software programs and manipulate the data structures, such as a routing table 547 and RMC policy tables 549*a-c*. An operating system 542 (e.g., IOS™ of Cisco Systems, Inc.), portions of which are typically resident in memory 540 and executed by the processor(s), functionally organizes the RMC by, inter alia, invoking network operations in support of software processes and/or services executing on the device. These software processes and/or services may comprise RMC process/services 548 and an illustrative policy integration process 544 (discussed in further detail below) in accordance with one or more embodiments described herein. It will be apparent to those skilled in the art that other processor and memory means, including various computer-readable media, may be used to store and execute program instructions pertaining to the inventive technique described herein.

The RMC (e.g., master OER controller) process/services 548 contains computer executable instructions that may be executed by each processor 520 to perform functions related to controlling OER functions in the network 100. In particular, RMC process 548 may incorporate the statistics and measurements received from one or more routers (OER processes 448 discussed above), and may determine one or more optimal network paths (e.g., toward a particular network egress of ER1 and ER2) through which traffic should travel (that is, "best exit selection"), e.g., based on its routing table 547 (similar to routing table 447 described above). Such best exit selections may be based on traffic type, traffic class, destination prefixes, etc., as well as their real-time performance as determined by the received statistics. Illustratively, the best exit selections may be forwarded to edge routers 400 of the network (e.g., ER1 and ER2), which may propagate (routing advertisements) to other routers 400 (A-D) within the network 100, accordingly. For instance, the RMC process 548 may inform the edge routers how to redistribute traffic by, e.g., associating new BGP local-preference values with selected traffic or statically changing the routing table contents of the edge nodes. These BGP local-preferences or routing table contents are then distributed by the edge routers within the network 100. Notably, the RMC may be distributed among a plurality of nodes, and thus need not reside in a single RMC node. Also, it is not necessary for a single RMC node to contain routing processes or routing tables, other than what is necessary for communication with the border nodes.

Illustratively, the RMC 500 may have a policy table 549*a* that stores OER-based policies for use with making OER-based decisions (e.g., best exit selections). For instance, a policy may be defined to route traffic from a type of "high-speed" application (e.g., voice calls) over an optimal path based on the shortest delay or RTT, while other policies may be defined to route "low-speed" applications (e.g., email, data backup, etc.) over an optimal path that has the lowest packet loss. In other words, through various OER-based policies, voice traffic from a prefix "X1" destined to prefix "Y1" may utilize a first network egress ER1 (e.g., via a first ISP(A)), while backup traffic from X1 to Y1 may utilize a second network egress ER2 (e.g., via a second ISP(B)) based on the performance characteristics of each traffic class as measured over the available paths to meet the policy requirements. Note, also, that "OER policies" or "traffic policies" are used generally herein to describe policies defined/configured at the RMC 500, and is not meant to limit the embodiments described herein to OER related policies only, such as for best exit selection, etc. (For instance, illustrative traffic policies may be policies for which an execution trigger is the arrival of a data packer, and for which the action(s) constitutes some form of processing of this packet before it is forwarded to another device.)

F. Policy Tables

FIG. 6 is a schematic block diagram of an example policy table 600 that may be advantageously used with one or more embodiments described herein, for instance, as a policy table 249, 349, 449, and/or 549 for each respective type of device described above. The policy table 600 is illustratively stored in an appropriate memory (e.g., 240, 340, 440, or 540, respectively) and includes one or more entries 650, each comprising a plurality of fields for storing at least a policy classification 605 and an action 610 to be performed in accordance with one or more policies (that is, an entry 650 comprising a classification 605 and action 610 may define a policy). The table 600 may be illustratively maintained and managed by appropriate processes of each device in network 100 (e.g., security server process 245, policy enforcement processes 344, 444, and policy integration process 544). Those skilled in the art will understand that while a table is shown and described herein, other known data structures and entries may be used in accordance with the present invention, and the table 600 as shown is merely illustrative.

In particular, policy classification field 605 may illustratively be used to store distinguishing information that may be used for classifications (e.g., types/classes of traffic) to which policies may be applied. For instance, traffic may be distinguished/classified based on certain information, such as traffic type information (e.g., whether the traffic is voice, data, email, data backup, etc.), traffic class information (e.g., particular types of traffic to/from particular sources/destinations, etc.), or, even more specifically, to particular application data streams (e.g., a particular stream of data for an application, such as a particular voice call) as described herein. Any other distinguishing feature that may be applied to traffic within the network may also be contained within policy classification field (e.g., time of day, dependent/combination policies, such as "if this AND that", etc.), and those mentioned herein are merely representative examples. Notably, default policy classifications may also be applied, such as applying a policy to all traffic, as will be appreciated by those skilled in the art.

Also, action field 610 may illustratively store appropriate actions/responses to be performed on policies of entries 650 in response to traffic's being classified within a particular policy classification 605. For example, depending upon the policy configuration, various actions may be performed such as setting/altering priority values, applying traffic control (e.g., shaping, dropping, queuing, etc.), defining alternate routes, etc. Entries of action field 610 are merely illustrative and may comprise other actions to be taken as will be understood by those skilled in the art.

G. Integrating Security/Control Policies with Optimized Routing Traffic Policies As noted above, there may be occasions, where network 100 may have both a control server 200 and an RMC 500 in operation, but with little or no interaction. Because of this, the RMC typically has no knowledge of the control server's control policies (and vice versa), that is, without inefficient and cumbersome manual configuration. For example, the control server 200 may have one or more control policies directed toward sources (hosts) of the traffic, such as assigning higher priority to preferred (privileged) users than non-preferred (non-privileged) users. Conversely, the RMC 500 may have other OER/traffic policies directed toward differentiating voice traffic as a higher priority than data traffic. Without interaction, these policies may conflict in a manner that is contrary to original intentions of the policies. For instance, based on this simplified example, the non-preferred users may have voice traffic sent at a higher priority than data traffic sent by the preferred users, which may defeat the purpose of the control policies in the network 100.

As another example, the control agents 300 may be aware of the particular types/classes of traffic (or, more particularly, specific streams of traffic), to which the control server 200 wishes to apply certain policies. However, those policies often become moot within the network (e.g., at routers 400), since the routers are often unaware of the classifications (type/class) of the traffic known to the agents 300, and would further be unaware of the actions to be applied to that traffic (i.e., the routers have no knowledge of the control policies). For instance, a control policy may define certain path criteria for a specific type of traffic (e.g., maximum delay values for a specific application), but without identifying that specific application or the maximum delay value to the RMC 500, the paths through the network for that type of traffic may not be optimally routed according to the desires of the control server.

In other words, as noted above, the RMC 500 is generally unable to optimize routing paths of the network domain based on control server traffic policies. Furthermore, without collaboration between the control server and the RMC, conflicts between each of their policies may arise, such as different priority assignments and handling for particular types of traffic, etc.

According to embodiments of the disclosure, a first set of one or more control policies at a control server 200 of a network domain 100 may be transmitted to an RMC 500 of the network domain, which uses a second set of one or more traffic policies to determine one or more optimal paths for directing traffic through the domain. The RMC may then generate a third set of one or more integrated policies based on the first and second sets of policies, e.g., based on the knowledge and policies of both the control server and the RMC. Also, the RMC 500 may classify one or more traffic classes and associate at least one optimal path with each of the one or more traffic classes based on the third set of integrated policies. The RMC may notify one or more routers 400 in the network domain 100 of the at least one optimal path for the traffic classes, and the routers may then route traffic based on the traffic class and the associated optimal path (i.e., based on the integrated set of policies).

In particular, the embodiments described herein not only combine the control policies and traffic policies for ease of configuration, but also provide an advanced level of policy generation and processing. For instance, as described further below, the control server's knowledge may add value to the generation of policies at the RMC. That is, the control server 200 has knowledge of control policies, but also other control-based (or security-based) knowledge, such as the priority of certain hosts in the network, etc. (For example, the control server may define a set of "privileged" hosts having a higher priority than other hosts in the network.) In this manner, in times of congestion in the network, integrated policies generated by the RMC 500 may use that knowledge to forward traffic through the network in an appropriate manner. In other words, if the traffic flow's source or destination address matches the address of the privileged hosts, then those traffic streams may be given a higher priority than any other traffic streams (e.g., when there is contention for network resources, the integrated policies from the RMC 500 ensure that the host with the higher priority is given access to its required network resources).

In addition, the control server 200 is aware of certain applications within the network 100, and thus may not only dictate the priority of the hosts and the control policies, but may also formulate control policies regarding application performance. For example, based on the applications, as well as the control server's knowledge of the kind of optimization treatment each traffic class should be given, the control server may generate knowledgeable control policies, which may be shared with the RMC 500 for dynamic integration into the policies distributed to routers/devices 400 of the network, accordingly.

Further to policy optimization, the control server 200 may be configured to detect a threat, attack, or other detectable abnormal behavior of traffic flowing through the network. As such, the control server 200 may communicate with the RMC 500 requesting that the offending traffic either be dropped at the network edge (edge routers ER1 and/or ER2), or be sent to a quarantine area, thus enabling the network to secure itself.

According to one or more embodiments as described herein, therefore, techniques not only dynamically integrate routing control and performance policies with security/control policies for ease of configuration, but also add value to the formulation of policies by applying control server knowledge at the RMC 500. In this manner, control server polices, configuration, and knowledge may be advantageously integrated with RMC optimized network performance and control.

H. Illustrative Embodiments and Aspects of Integrating Policies

Illustratively, one or more embodiments described herein may utilize a policy integration process 544 of RMC 500 in conjunction with control server process 245 of control server 200 (e.g., and policy enforcement processes 344 and 444) to allow multiple sets of policies to be integrated into a single set of comprehensive policies. In particular, policy integration process 544 contains computer executable instructions that may be executed by each processor 520 to perform functions related to the embodiments described herein for integrating policies, such as described above and further below. For example, the RMC 500 may use its own set of one or more policies in conjunction with one or more policies from the control server 200 to establish an integrated set of one or more policies by which to route traffic in network 100. Also, the RMC 500 may inform routers 400 (e.g., edge routers ER1 and ER2) of optimized paths for the traffic which may be derived using both control server policies and RMC policies (i.e., the integrated/third set of policies) in an advantageous manner as described herein.

Operationally, according to one or more embodiments described herein, a first set of one or more control policies (e.g., control server policies 249) is determined at a control server 200 of the network domain 100 as described above. For example, control server policies 249 may be based on, inter alia, host priority, traffic class, application stream (flow), etc. Once the control server has a set of one or more control policies (a first set of policies), the security server 200 may then transmit the control policies to RMC 500. For example, in addition to sending the policies to control agents 300 of the network 100, the control server may be configured to transmit its policies to an RMC of the network, e.g., discovered through manual configuration and/or dynamic discovery. For instance, the RMC 500 may have advertised its functionality within the network 100, such as through various proprietary or standardized advertisement techniques (e.g., broadcast IGP messages), such that the control server 200 may discover the RMC, as may be appreciated by those skilled in the art. Once the control server 200 is aware of the RMC 500, a "collaboration message" 150 (FIG. 1) may be sent over the links of the network 100 in accordance with one or more embodiments herein, e.g., a directly addressed message from the server 200 to RMC 500 (such as, e.g., for an application programming interface, or "API" session). Alternatively, the message 150 may be advertised within the network 100 without knowledge of the RMC 500, such that the RMC 500 may detect the control server's message 150 and utilize it accordingly (e.g., message 150 may be broadcast into the network 100 for receipt by the agents 300 and RMC 500).

As an illustrative example, assume that the following application traffic streams are flowing within network 100 (e.g., through ER1 and ER2), whose traffic classes may be defined by the control server 200:

1. Traffic Type: Citrix application;
    Traffic Optimization requirements: Sensitive to delay more than 100 ms;
    Traffic identifier: DSCP Marking="EF".
2. Traffic Type: Data Backup;
    Traffic Optimization requirements: Less loss but can have higher delay;
    Traffic identifier: DSCP Marking="EE".
3. Traffic Type: Voice;
    Traffic Optimization requirements: Requires low jitter, delay less than 50 ms, low loss;
    Traffic identifier: DSCP Marking="ED".
4. Traffic Type: Web Traffic
    Traffic Optimization requirements: Doesn't need any performance, move traffic to reduce the bandwidth;
    Traffic identifier: DSCP Marking="EC".

As described above, these defined traffic markings may be transmitted from the control server 200 to the one or more control agents 300 in the network 100. As such, the control agents may mark the traffic 140 in response to the control server's defined markings (e.g., marking voice traffic with "ED", etc.). In addition, the control server 200 may know corresponding optimization treatments that should be given to each traffic class, such as, for example:

1. Policy "Red":
    Classification: Match all traffic having DSCP marking "EF";
    Action: Send traffic out through the edge router (e.g., a VPN tunnel) having lowest round trip delay (RTT).

2. Policy "Yellow":
   Classification: Match all traffic having DSCP marking "EE";
   Action: Send traffic out through the edge router having lowest loss.

However, without the techniques described above, the control agents 300 are substantially powerless to direct traffic within the network 100 according to the defined policies, and may simply mark the traffic accordingly (and hope for the best). In accordance with one or more embodiments described herein, though, the control server 200 may have particular knowledge about these one or more significant applications in the network 100 that the RMC 500 may not have been conventionally aware, and may share this knowledge accordingly. In other words, through message 150, the control server 200 may inform the RMC 500 of the one or more control policies.

Upon receiving the set of one or more policies from the control server 200, the RMC may store the control policies in a corresponding table 549b. Illustratively, table 549a is a separate table from OER policies table 549a (e.g., populated as described above), however, in an alternative embodiment, tables 549a and 549b may be a shared table 549ab (not shown) that may contain an indication within its entries (650) as to whether the respective policy originated at the RMC 500, or was received from the control server 200 (or other device).

In accordance with one or more embodiments described herein, the RMC 500 may generate a third set of integrated policies based on the OER/traffic policies in table 549a and the control (or other) policies in table 549b. For instance, the integrated policies (e.g., stored in table 549c or a combined table 549abc as mentioned above) may be illustratively derived by combining the first and second sets of policies, that is, the control and traffic policies. For example, if an OER/traffic policy indicates that voice traffic be sent over a path having the lowest delay, and a control policy indicates that voice traffic be granted a priority value of "1", then a combined (integrated) policy may state that voice traffic be granted a priority value of "1" AND be sent over a path having the lowest delay. Alternatively, the integrated set of policies may simply contain both policies (priority "1" and lowest delay path), so long as the policies do not conflict (i.e., the traffic may be classified under more than one policy classification 605, this more than one corresponding policy action 610 may be performed on the traffic, accordingly).

In the event, however, that policies from the control and traffic policies do conflict in some manner, various techniques may be applied to resolve such conflicts. For instance, one set of policies may simply override or "trump" another set, such as where the OER/traffic policies trump any overlapping polices of the control policies. For example, if an OER/traffic policy indicates that voice traffic be granted a priority value of "3", and a control policy indicates that voice traffic be granted a priority value of "1", then a combined (integrated) policy may state that voice traffic be granted a priority value of "3", where the OER/traffic policy trumps the control policy. Note that various policies may be combined in any manner possible, and any such combination of the two (or more) sets of policies is contemplated herein to derive the third set of policies. As one example, the priority values "1" and "3" may be averaged to "2" as an integrated policy, or, conversely, the highest (or lowest) priority value may always be selected, regardless of the priority value's origin, etc. As another example, assume that the control server 200 assigns both a certain priority value (e.g., "0", the highest) to a particular host (such as a president of a company) and another priority value for all other traffic (e.g., "3"), while the RMC places a generic priority on voice traffic (e.g., "2"). An example integrated policy may be that any traffic from the particular host receive priority "0", all other voice traffic receive priority "2", and all non-voice and non-particular-host traffic receive priority "3".

Other, more complex examples of policy combinations and/or conflicts may exist, and such combinations/conflicts may be resolved in any manner deemed appropriate by a system administrator or other dynamic selection process. Those described herein are merely illustrative examples. For instance, further assume that the control server indicates that voice traffic to a destination prefix "X1" be sent over low delay links, but the RMC has determined that traffic to destination prefix "X1" should be sent over links with the lowest packet loss. If there is high packet loss when traffic is sent over the lowest delay links to the destination "X1" or high delay when sent over low loss links (e.g., as determined by RMC 500 through obtained statistics, as described above), the policies above conflict. Thus, the RMC 500 may resolve the conflicts in any manner deemed appropriate (e.g., as mentioned above). Accordingly, by resolving the conflicts and providing a single set of integrated policies, either through combination, overriding, merging, etc., the techniques described herein may avoid any conflict between dissimilar policies of identically defined traffic classes (e.g., all voice traffic) between the control server 200 and RMC 500.

Notably, modifications to either the control or OER/traffic policies may respectively modify the integrated policies. For example, the control server 200 may update the RMC 500 of the newly modified control policies, and/or the RMC may itself be aware of changes to the OER policies. Accordingly, the RMC (policy integration process 544) may re-generate the integrated policies (in table 549a) as needed.

In addition to informing the RMC 500 of the control policies, the control server 200 may also inform the RMC of additional information useful to integrating policies, and more particularly, to acting upon those integrated policies. For instance, in order for the RMC to classify traffic classes, the security server 200 may inform the RMC of the traffic classes defined by the control server. For example, the markings, application streams, or other traffic class classification information may be included within the collaboration message 150 transmitted from the control server (e.g., in the same message as the policies or in a separate message). As such, the RMC may thus classify one or more traffic classes, such as by mapping the application streams or markings to respective traffic classes. Alternatively or in addition, the RMC 500 may learn the application streams dynamically, and may map the stream to a policy (e.g., Red) because of the stream's properties (e.g., DSCP in this example) and then take the action defined in policy Red. In such an example, the traffic class with DSCP marking "EF" can be associated with policy "Red", which may have a priority of "1" and has one or more exit selection rules such that the traffic is sent through the path with least latency. In another example, any data that is unmarked could have the lowest priority. (Note again, that DSCP based traffic identification is merely an example.)

Also, according to one or more embodiments herein, the RMC 500 may, based on the integrated policies, determine at least one optimal path (that is, an optimal exit/egress from network 100) which conforms to the integrated policies to be associated with each of the one or more traffic classes. For example, the RMC 500 may use network statistical information obtained through OER processes described above to determine that traffic exiting through ER1 will have the lowest RTT, while traffic exiting through ER2 will have the lowest packet loss (illustrative examples only). Having made such a determination, the RMC may calculate an optimal path for the various traffic classes that are so interested in such statistics, such as according to policies Red and Yellow above. For instance, traffic marked with an "EF" (e.g., Citrix application traffic) may be routed through ER1 for the lowest RTT according to policy Red, while traffic marked "EE" (e.g., data backup traffic) may be routed through ER2 for the lowest packet loss. Notably, assuming equal reachability, the destination address prefix to which the traffic ("EF" and "EE") is bound may be the same prefix, but through the distinguishing classification of packet marking, may be routed differently out of network 100, that is, over individualized optimal paths based on the integrated policies, accordingly.

Moreover, in accordance with OER techniques described above, RMC 500 may determine that additional traffic monitoring and statistic gathering may be beneficial based on the received policies from the control server 200. For instance, if the control policies indicate particular traffic classes not already monitored for the RMC (e.g., particular application traffic, particular application data streams/flows, etc.), then the RMC 500 may request that the OER process 448 of edge routers ER1 and ER2 monitor those new traffic classes (or other parameters) in order to more directly determine an optimal path for those traffic classes.

Illustratively the RMC 500 may notify one or more routers 400 in the network domain 100 of the at least one optimal path associated with each of the one or more traffic classes. For instance, the path selections may be sent only to the edge routers ER1 and ER2 (e.g., OER-equipped routers), which may then send/advertise the path selections into the network domain according to conventional routing protocols. For example, if traffic marked "ED" is to be routed out edge router ER2, then routes may be advertised for the traffic marking accordingly, and the routers 400 may thus store the received routes as part of an adequately configured routing table 447 (i.e., configured to route based on traffic markings).

Alternatively, routers 400 may be directly informed of the integrated policies, and may store the received policies in policy table 449. In this manner, the routers 400 (e.g., A-D) themselves may be configured to apply the integrated policies (through policy enforcement process 444) to the policies to route traffic accordingly. For example, rather than indicating in routing tables 447 that traffic "ED" is to be routed toward ER2, the routers 400 may determine the marking, and may perform a lookup into the policies to determine that the traffic is to be routed toward ER2, and then based on routing tables 447, determine the path to ER2, accordingly.

Regardless of how the policies are propagated to the routers 400, upon receiving traffic 140 at one of the routers 400 of the network 100, the receiving router may determine the traffic class of the traffic, such as by identifying the markings of the traffic (e.g., DSCP) or other identifying/classifying feature (e.g., source/destination, etc.). Based on the integrated policies (e.g., policy enforcement process 444 using policy table 449) and routing techniques (e.g., routing process 443 and routing table 447), the routers 400 route the traffic 140 accordingly. For instance, local policies 449 at the router may indicate that higher priority traffic be granted network resources before lower priority traffic. Other policies may be maintained at the routers 400 within routing table 447, such as utilizing the associated optimal paths received from the RMC (e.g., via edge routers ER1 and ER2), routing the traffic based on the traffic markings/classes, and routing the traffic according to routing entries corresponding to the identified traffic (e.g., "EE" traffic to ER1, "EF" traffic to ER2, unmarked voice traffic to ER2, etc.). On the other hand, as mentioned above, the traffic classifications may be applied to policy table 449, and then appropriate routes based on the associated policy may be determined from the routing table 447.

Figure 7:
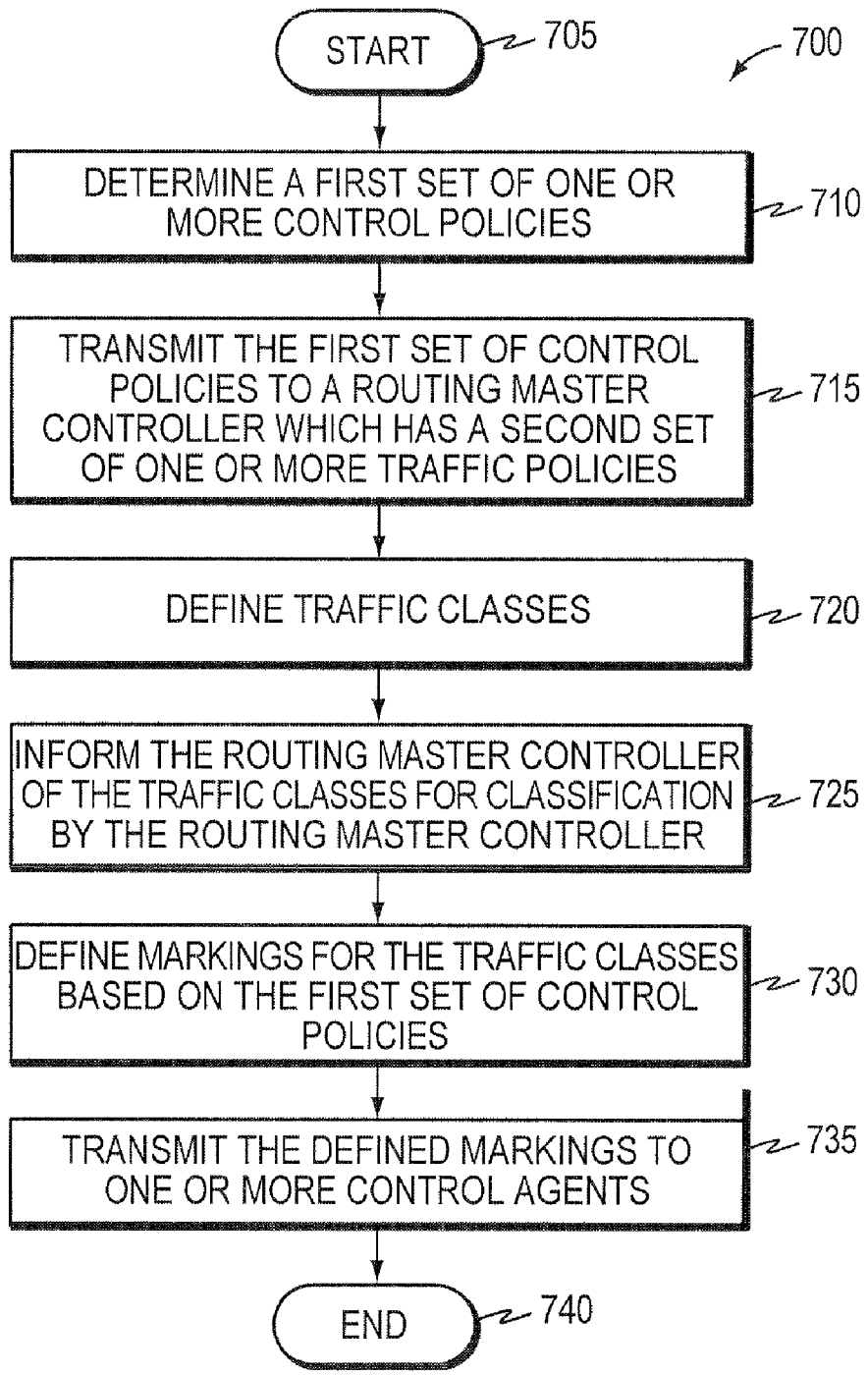
FIG. 7 illustrates an example procedure for integrating control and traffic policies into a single set of integrated policies, e.g., from the vantage point of a control server.

FIG. 7 illustrates an example procedure for integrating control and traffic policies into a single set of integrated policies, e.g., from the vantage point of a control server 200, in accordance with one or more embodiments described herein. The procedure 700 starts at step 705, and continues to step 710, where the control server determines a first set of one or more control policies, such as through manual or dynamic configuration, as mentioned above. In step 715, the control server transmits the first set of control policies (e.g., in message 150) to a routing master controller 500, which has a second set of one or more traffic policies. In particular, as mentioned above, the control server 200 may be aware of the routing master controller 500 through manual configuration or through various dynamic discovery protocols. In addition, in step 720, the control server may define traffic classes, such as data traffic, voice traffic, etc., and in step 725, may also inform the routing master controller of the defined traffic classes for classification by the routing master controller. Further, in step 730, the control server may define markings for the traffic classes based on the control policies (e.g., "EE", "EF", etc.), and may transmit the defined markings to one or more control agents 300 in step 735. The procedure 700 (for the control server) then ends in step 740.

Figure 8:
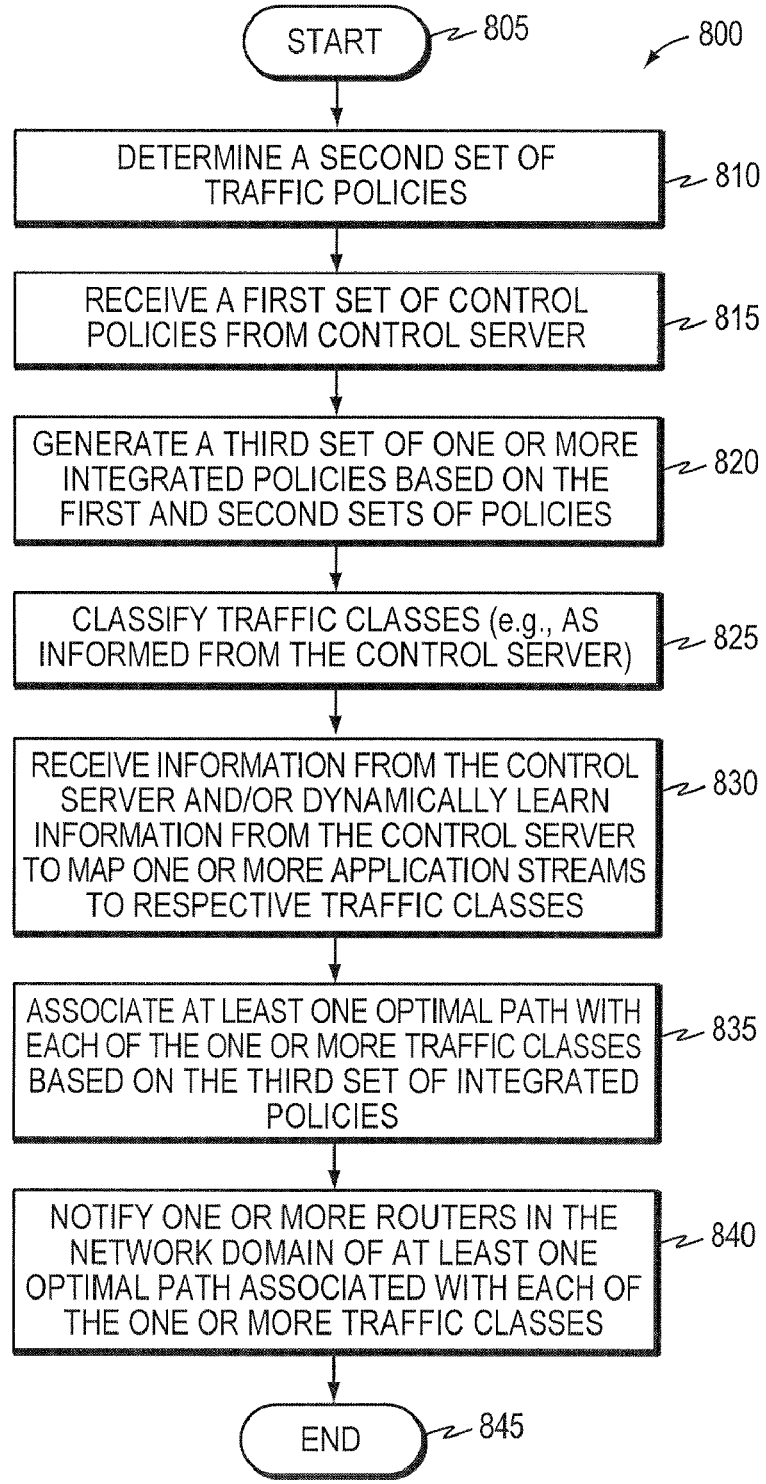
FIG. 8 illustrates an example procedure for integrating control and traffic policies into a single set of integrated policies, e.g., from the vantage point of a routing master controller.

FIG. 8 illustrates an example procedure for integrating control and traffic policies into a single set of integrated policies, e.g., from the vantage point of a routing master controller 500, in accordance with one or more embodiments described herein. The procedure 800 starts at step 805, and continues to step 810, where the routing master controller 500 determines a second set of traffic policies, such as preconfigured and/or default traffic policies, or dynamically defined policies of the routing master controller as described above. Next, in step 815, the routing master controller receives the first set of control policies from a control server 200 (e.g., message 150). Once more than one set of traffic policies is available to the routing master controller (e.g., the first and second sets), the procedure 800 proceeds to step 820, where the routing master controller may generate a third set of one or more integrated policies based on the multiple (e.g., first and second) sets of policies. For example, as described above, the integrated policies may be generated through various combinations of the first and second sets of policies (e.g., the control and traffic policies).

Further, the routing master controller 500 may be configured to classify traffic classes in step 825, e.g., as informed from the security server 200 and/or as determined by the routing master controller itself. In addition, in step 830, the routing master controller may receive information from the control server and/or dynamically learn information itself to map one or more application streams to respective traffic classes. In step 835, the routing master controller may associate at least one optimal path with each of the one or more traffic classes based on the integrated policies (as described above), and in step 840 may notify one or more routers 400 in the network domain of the optimal paths (e.g., ER1 and ER2). The procedure 800 (for the RMC) then ends in step 845.

Figure 9:
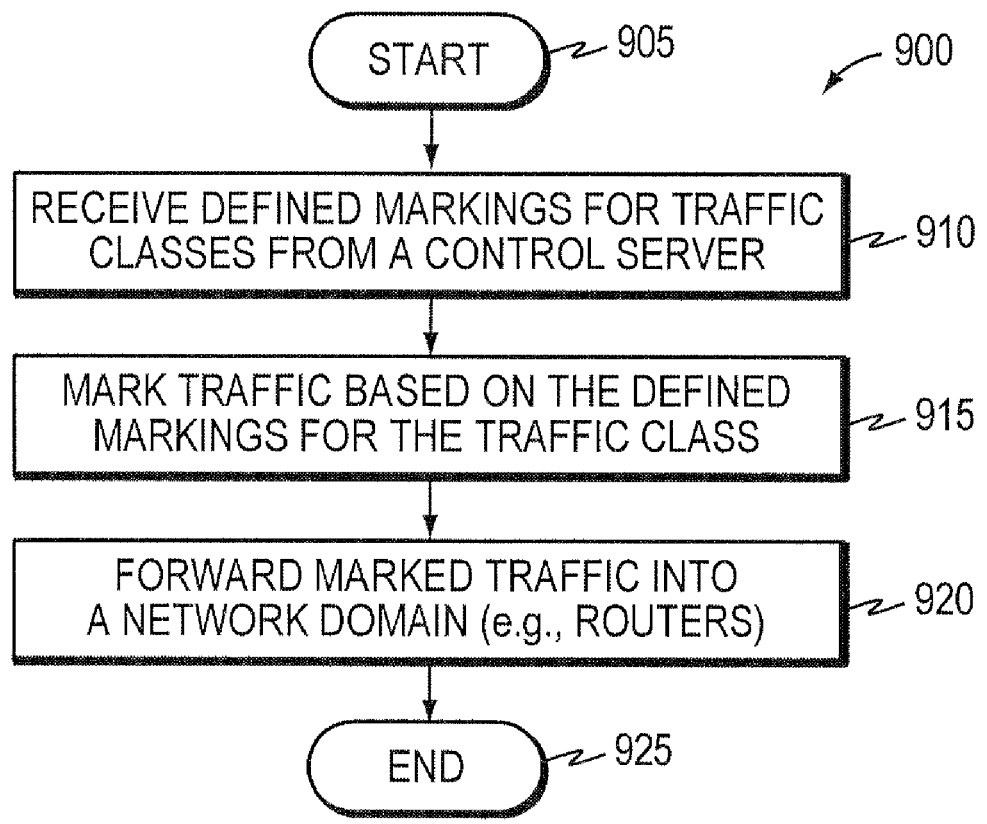
FIG. 9 illustrates an example procedure for use by security/control agents.

FIG. 9 illustrates an example procedure for use by control agents 300 (345) in accordance with one or more embodiments described herein. The procedure 900 starts at step 905, and continues to step 910, where the control agent 300 receives defined markings for associated traffic classes (e.g., "EE", "EF", etc.) from a control server 200 (such as from step 735 of procedure 700 in FIG. 7 above). As the control agent 300 receives/generates traffic for transmission into the network domain in step 915, the control agent may mark the traffic in step 920 based on the defined markings for the traffic class associated with the traffic. For instance, if the traffic to be marked at the control agent 300 corresponds to data backup, then the control agent may mark the traffic with the corresponding (illustrative) traffic identifier "EE". Once the traffic is marked (or not, as mentioned above), the control agent 300 may forward the traffic into the network domain towards its destination (e.g., via routers 400) in step 925, and the procedure 900 ends in step 930. Note that the procedure 900 may return to step 915 upon receiving traffic, or to step 915 upon receiving updated/additional traffic markings.

Figure 10:
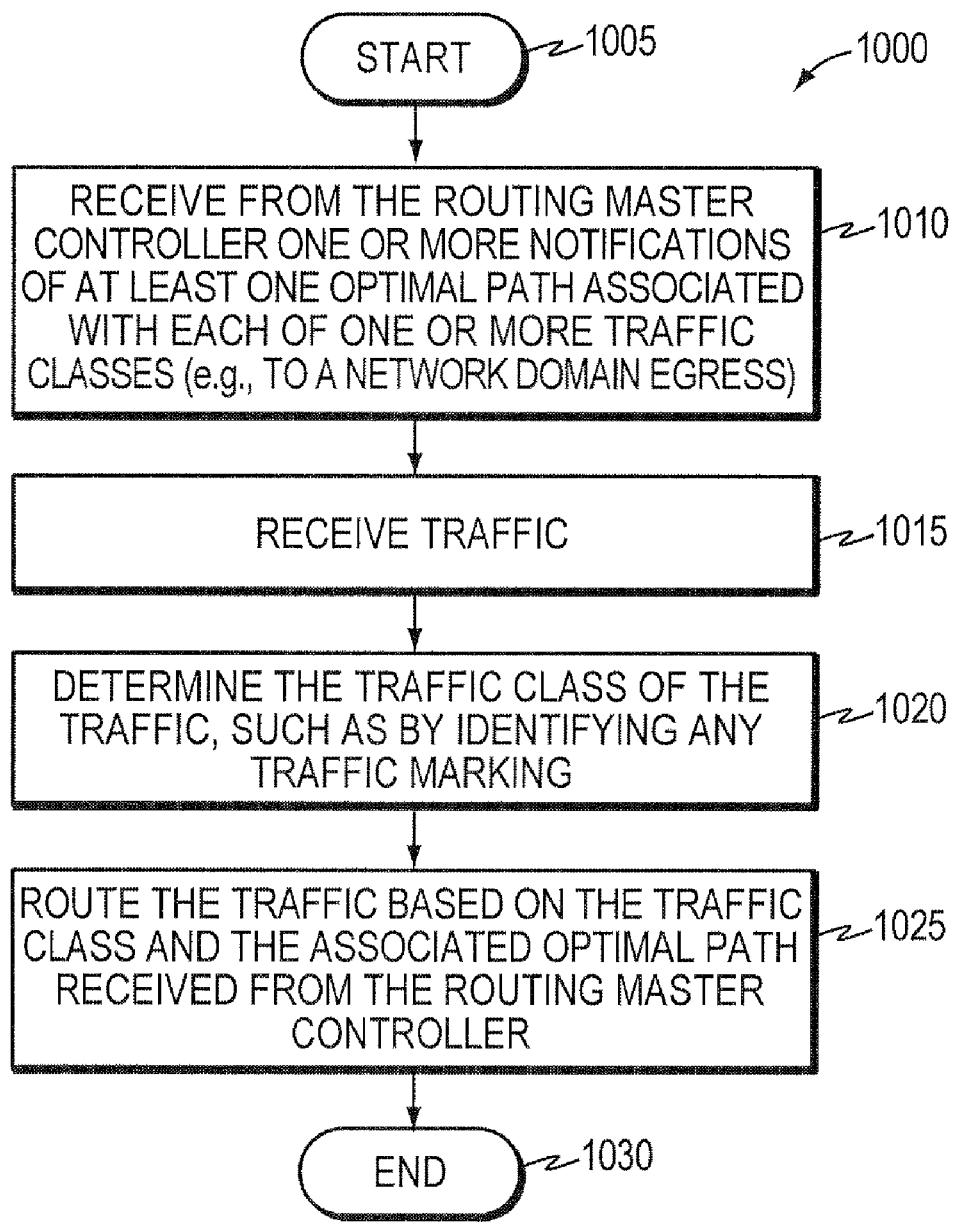
FIG. 10 illustrates an example procedure for use by routers.

FIG. 10 illustrates an example procedure for use by routers 400 in accordance with one or more embodiments described herein. The procedure 1000 starts at step 1005, and continues to step 1010, where the router 400 receives from the routing master controller 500 one or more notifications of at least one optimal path associated with each of one or more traffic classes (e.g., to a network domain egress—routers ER1 and ER2) as determined by the routing master controller 500 based on the integrated policies as mentioned above. Upon receiving traffic in step 1015, the router may determine the traffic class of the traffic in step 1020, such as by identifying any traffic marking (e.g., the traffic marked "EE" signifying data backup) or other determination technique mentioned herein or as will be understood by those skilled in the art. Once the traffic class of the received traffic has been determined, the router may route the traffic in step 1025 based on the traffic class and the associated optimal path received from the routing master controller, and the procedure ends in step 1030. Note again that the procedure 1000 may return to step 1010 upon receiving traffic or to step 1020 upon receiving updated/additional traffic markings.

Notably, while the steps in each of FIGS. 7-10 have been shown in a particular illustrative order, it should be appreciated by those skilled in the art that any suitable ordering of the above steps is contemplated. For example, traffic classes may be defined by the routing master controller 500 in FIG. 8 prior to receiving additional traffic class information from the control server 200, or the control server in FIG. 7 may transmit markings to control agents 300 prior to the routing master controller, etc.

Advantageously, the novel techniques described herein integrate a plurality of traffic/routing policy sets into a single integrated traffic/routing policy set in a computer network. By creating an integrated policy set (table) at an RMC, the novel techniques allow for communication within a network that is optimized based on the integrated policies, such as for routing optimization and for security/access control within the network. Also, the dynamic aspects of one or more embodiments described herein alleviate the need for cumbersome and inefficient manual configuration, e.g., such that modification to the first or second sets of policies may result in dynamic modification of the integrated third set of policies, accordingly.

Note that as another example of integrated policies, where control policies may involve threat detection (e.g., preventing various threats, attacks, or other abnormal behavior), such threats may have been dropped or sent to a quarantine area for further investigation by the control agents 300. According to the techniques above, by distributing the control policies to routers in the network (e.g., ER1 and ER2), traffic threats may now be advantageously averted at the edge of the network, prior to entering the network and causing potential harm (e.g., in essence, delegating certain control agent responsibilities to routers 400 of the network 100). For example, the control server 200 may detect a security event, such as a threat, attack, or other abnormal behavior, and may inform the RMC 500, requesting performance of a particular security action, such as dropping the traffic, or redirecting it to a quarantine area or "sinkhole". Alternatively, the control server 200 may inform the RMC 500 of various control policies that would allow the RMC (or the routers 400 to which the integrated policies are distributed) to detect the threat, attack, etc. (security events), and to act accordingly, as described above.

While there have been shown and described illustrative embodiments that route traffic based on an integrated set of one or more policies, it is to be understood that various other adaptations and modifications may be made within the spirit and scope of the present invention. For example, the embodiments have been shown and described herein with reference to security/control servers and security/control policies. However, the embodiments of the invention in their broader sense are not so limited, and may, in fact, be used with other types of network devices configured to maintain a policy set that may beneficially be integrated with optimized routing policies, as may be appreciated by those skilled in the art. Also, while the illustrative policy integration process 544 is shown and described within RMC 500, a separate policy integration device (not shown) may be used to obtain and integrate the sets of policies (e.g., the security policies and routing policies), and to distribute the integrated policies to appropriate devices (e.g., agents, routers, RMCs, etc.) within the network.

The foregoing description has been directed to specific embodiments of this invention. It will be apparent, however, that other variations and modifications may be made to the described embodiments, with the attainment of some or all of their advantages. For instance, it is expressly contemplated that the components and/or elements described herein can be implemented as software, including a computer-readable medium having program instructions executing on a computer, hardware, firmware, or a combination thereof. Also, electromagnetic signals may be generated to carry computer executable instructions that implement aspects of the present invention over, e.g., a wireless data link or a data network, such as the Internet. Accordingly this description is to be taken only by way of example and not to otherwise limit the scope of the invention. Therefore, it is the object of the appended claims to cover all such variations and modifications as come within the true spirit and scope of the invention.

What is claimed is:

1. A method, comprising:
receiving a first set of one or more control policies, from a control server of a network domain, at a routing master controller of the network domain, the routing master controller having a second set of one or more traffic policies used to determine optimal paths for directing traffic through the network domain;
generating a third set of one or more integrated policies at the routing master controller based on the first and second sets of policies;
classifying one or more traffic classes at the routing master controller; and
associating at least one optimal path with each of the one or more traffic classes at the routing master controller based on the third set of integrated policies.

2. The method of claim 1, further comprising:
notifying one or more routers in the network domain of the at least one optimal path associated with each of the one or more traffic classes.

3. The method of claim 2, further comprising:
receiving traffic at one of the routers;
determining the traffic class of the traffic at the router; and routing the traffic at the router based on the traffic class and the associated optimal path received from the routing master controller.

4. The method of claim 3, further comprising:
defining markings at the control server for traffic classes based on the first set of policies;
transmitting the defined markings to one or more control agents; and
marking traffic at the one or more control agents of the network domain based on the defined markings, wherein determining the traffic class at the router further comprises identifying the markings of the traffic.

5. The method of claim 1, further comprising:
defining the traffic classes at the control server; and
informing the routing master controller of the traffic classes for classification by the routing master controller.

6. The method of claim 1, wherein the at least one optimal path conforms to the third set of integrated policies.

7. The method of claim 1, wherein the optimal path is to a particular egress of the network domain.

8. The method of claim 1, further comprising:
mapping one or more application streams to respective traffic classes at the routing master controller.

9. The method of claim 8, further comprising:
transmitting information of one or more of the application streams from the control server to the routing master controller.

10. The method of claim 9, wherein the information identifies the one or more application streams.

11. The method of claim 8, further comprising:
learning about one or more of the application streams at the routing master controller.

12. The method of claim 1, further comprising:
associating one or more policies based on hosts of traffic with the first set of control policies, wherein the generated third set of integrated policies comprise the one or more policies based on the hosts of traffic.

13. A method, comprising:
receiving a first set of one or more control policies, from a control server of a network domain, at a routing master controller of the network domain, the routing master controller having a second set of one or more traffic policies used to determine optimal paths for directing traffic through the network domain; and
generating a third set of one or more integrated policies at the routing master controller based on the first and second sets of policies,
wherein generating the third set of integrated policies further comprises combining the first and second sets of policies.

14. The method of claim 13, further comprising:
determining that a particular policy of the first set of control policies conflicts with a particular policy of the second set of traffic policies; and
in response, determining that the first set of control policies trump the second set of traffic policies and selecting the particular policy of the first set of control policies for use in generating the third set of integrated polices.

15. A method, comprising:
receiving a first set of one or more control policies, from a control server of a network domain, at a routing master controller of the network domain, the routing master controller having a second set of one or more traffic policies used to determine optimal paths for directing traffic through the network domain;

generating a third set of one or more integrated policies at the routing master controller based on the first and second sets of policies;
detecting a security event based on the third set of integrated policies; and in response,
performing a security action associated with the security event based on the third set of integrated policies.

16. A system, comprising:
a control server of a network domain configured to determine a first set of one or more control policies;
a routing master controller of the network domain configured to receive the first set of control policies from the control server, the routing master controller having a second set of one or more traffic policies used to determine optimal paths for directing traffic through the network domain, the routing master controller configured to generate a third set of one or more integrated policies based on the first and second sets of policies, classify one or more traffic classes, associate at least one optimal path with each of the one or more traffic classes based on the third set of integrated policies, and notify one or more routers in the network domain of the at least one optimal path associated with each of the one or more traffic classes; and
wherein the one or more routers are configured to receive traffic, determine the traffic class of the traffic, and route the traffic based on the traffic class and the associated optimal path.

17. An apparatus, comprising:
one or more network interfaces configured to communicate with a control server and one or more routers of a network domain;
a processor coupled to the network interfaces and configured to execute one or more processes; and
a memory configured to store a routing master controller process executable by the processor, the routing master controller process, when executed, operable to: receive a first set of one or more control policies from the control server, use a second set of one or more traffic policies to determine optimal paths for directing traffic through the network domain, generate a third set of one or more integrated policies based on the first and second sets of policies, classify one or more traffic classes, and associate at least one optimal path with each of the one or more traffic classes based on the third set of integrated policies.

18. The apparatus as in claim 17, wherein the routing master controller process, when executed, is further operable to:
notify the one or more routers in the network domain of the at least one optimal path associated with each of the one or more traffic classes.

19. The apparatus as in claim 18, wherein the one or more routers are configured to receive traffic and to route traffic based on a traffic class and an associated optimal path.

20. The apparatus as in claim 17, wherein the routing master controller process, when executed, is operable to generate the third set of one or more integrated policies based on the first and second sets of policies by combining the first and second sets of policies.

21. An apparatus, comprising:
means for receiving a first set of one or more control policies, from a control server of a network domain;

means for maintaining a second set of one or more traffic policies used to determine optimal paths for directing traffic through the network domain;

means for generating a third set of one or more integrated policies based on the first and second sets of policies;

means for classifying one or more traffic classes; and means for associating at least one optimal path with each of the one or more traffic classes based on the third set of integrated policies.

* * * * *